Figure 1:
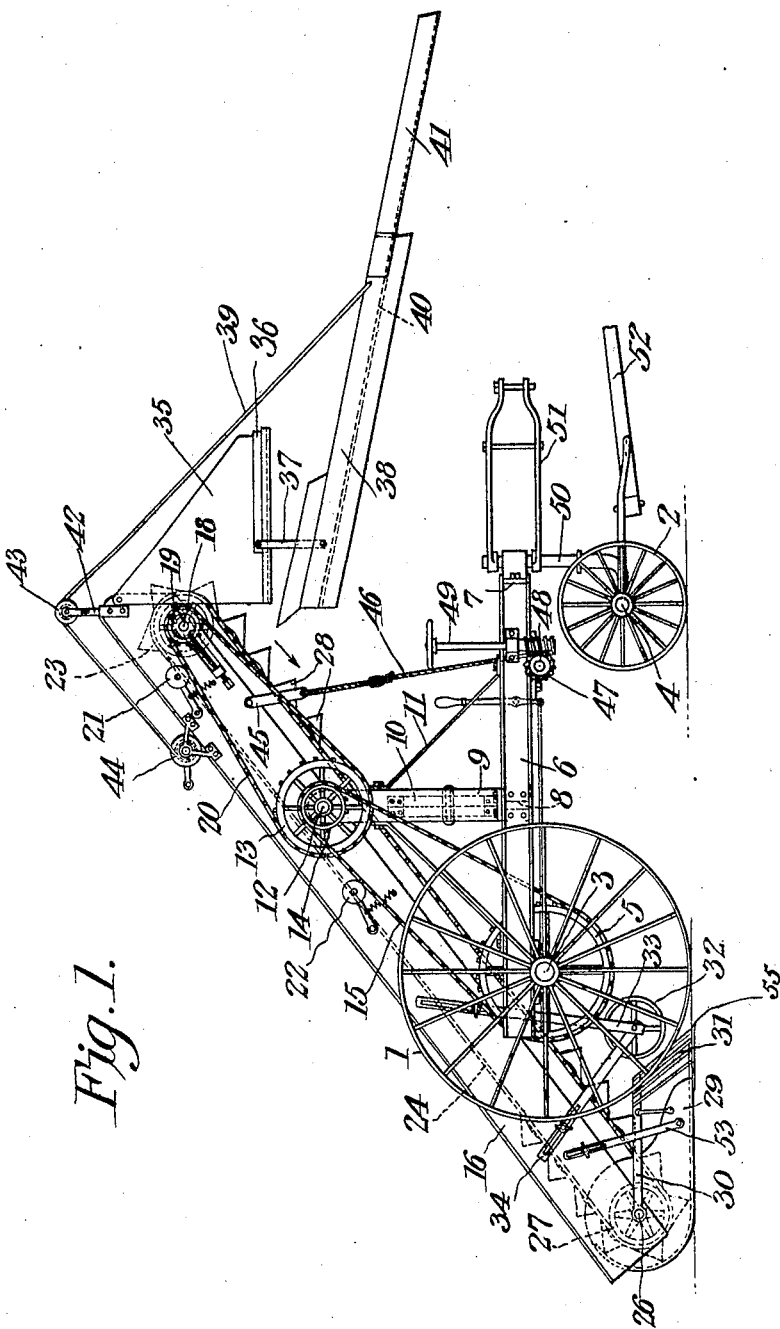

No. 849,577. PATENTED APR. 9, 1907.
G. T. SEBRELL.
COMBINED PLOW, SHOVEL, AND SEPARATOR.
APPLICATION FILED SEPT. 4, 1906.

3 SHEETS—SHEET 1.

WITNESSES: George T. Sebrell INVENTOR
By C. A. Snow & Co.
ATTORNEYS

No. 849,577. PATENTED APR. 9, 1907.
G. T. SEBRELL.
COMBINED PLOW, SHOVEL, AND SEPARATOR.
APPLICATION FILED SEPT. 4, 1906.
3 SHEETS—SHEET 2.
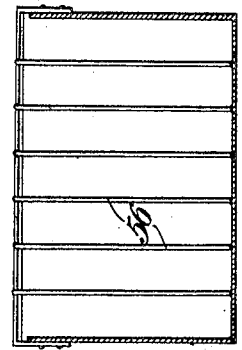
WITNESSES: George T. Sebrell  INVENTOR
By C. A. Snow & Co.
ATTORNEYS
THE NORRIS PETERS CO., WASHINGTON, D. C.

No. 849,577. PATENTED APR. 9, 1907.
G. T. SEBRELL.
COMBINED PLOW, SHOVEL, AND SEPARATOR.
APPLICATION FILED SEPT. 4, 1906.
3 SHEETS—SHEET 3.
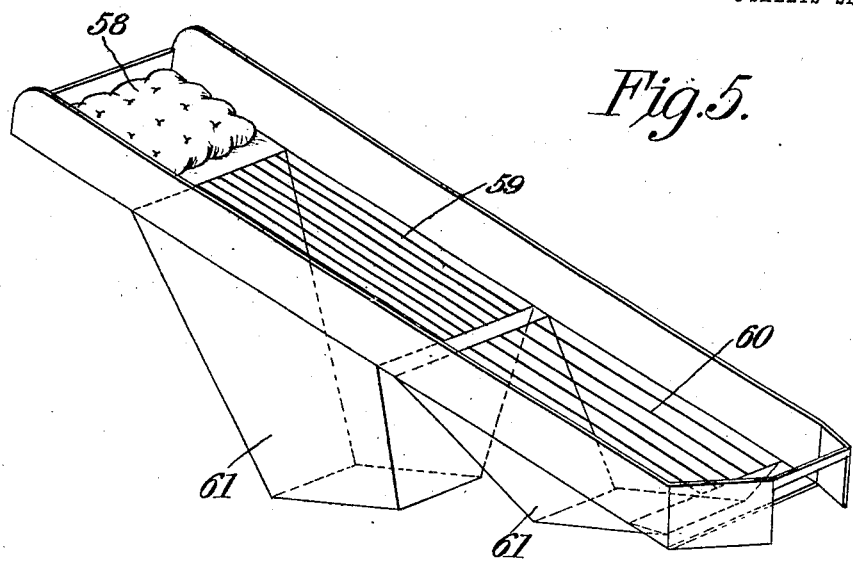
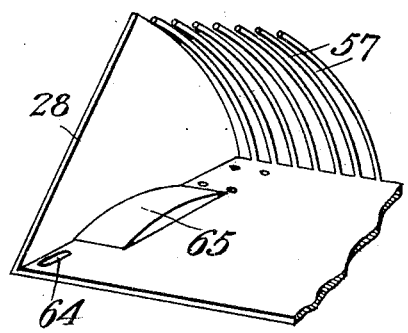
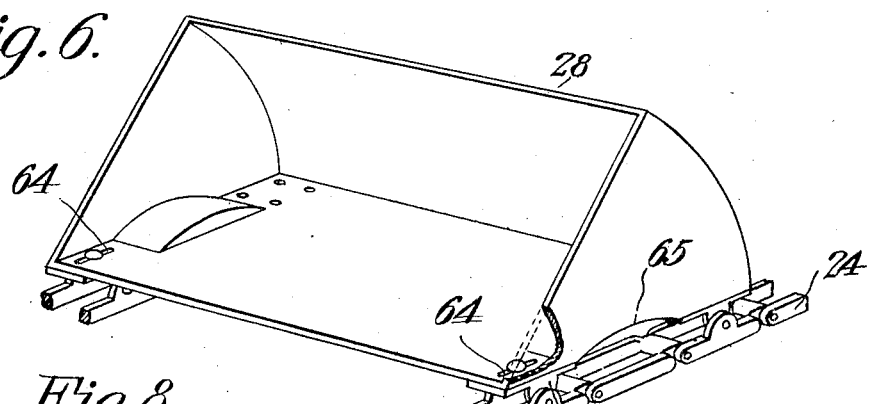
WITNESSES:
George T. Sebrell INVENTOR
By C. A. Snow & Co.
ATTORNEYS

UNITED STATES PATENT OFFICE.

GEORGE T. SEBRELL, OF ALSEA, OREGON.

COMBINED PLOW, SHOVEL, AND SEPARATOR.

No. 849,577.　　　　Specification of Letters Patent.　　　　Patented April 9, 1907.

Application filed September 4, 1906. Serial No. 333,225.

*To all whom it may concern:*

Be it known that I, GEORGE T. SEBRELL, a citizen of the United States, residing at Alsea, in the county of Benton and State of Oregon, have invented a new and useful Combined Plow, Shovel, and Separator, of which the following is a specification.

This invention is designed particularly for digging, screening, elevating, and loading gravel and sand, but it may by interchanging its attachments be used to advantage for digging, sorting, and sacking potatoes.

The machine consists, primarily, of a shovel having a steel point and shear sides. The point and shears are slightly curved downward to give it an inclination to dig into the ground instead of going out of the ground if it strikes stone or other obstructions. An elevator is connected with said shovel and is mounted upon a trapezoid-shaped framework. The said framework is supported by four wheels, two of which are traction-wheels. The front end of the trapezoid frame is provided with a turning-gear, which consists of a pair of wheels mounted upon an axle, which in turn is pivotally attached to the said frame, a bar of peculiar configuration serving as the pivot-point for the said axle. The elevator is equipped with sprocket-wheels at each end. Sprocket-chains pass over said wheels and are provided with a number of transversely-extending pans or buckets adapted to carry up gravel, sand, or other substances. A chute is pivoted at its upper end below the upper end of the said elevator and is adapted to be swung so as to deliver the sand or gravel in front or at any angle on either side of the machine. A means is provided for raising and lowering the chute.

In the accompanying drawings, Figure 1 is a side elevation of the implement. Fig. 2 is a top plan view of the same. Fig. 3 is a vertical sectional view of one form of shovel. Fig. 4 is a transverse sectional view of the same cut on the line 4 4 of Fig. 3. Fig. 5 is a perspective view of one form of chute. Fig. 6 is a perspective view of one of the elevator-buckets. Fig. 7 is a detail perspective view of a portion of a modified form of elevator-bucket. Fig. 8 is a detail sectional view of a means for attaching the buckets to the elevator-chains.

The traction-wheels 1 are mounted upon the axle 3. The front or steering wheels 2 are mounted upon the axle 4.

A sprocket-wheel 5 is mounted upon the axle 3, and the trapezoid truck-frame 6 is also mounted upon the said axle. The cross-beam 7 of the said frame is located at the forward end thereof. The cross-tie 8 of the said truck-frame is located near the rear end thereof and is provided with the uprights 9 9 for supporting the elevator.

The cross-braces 10 are attached at their ends to the uprights 9 and the cross-tie 8, while the side braces 11 are secured at their lower ends to the side of the frame 6 and at their upper ends to the uprights 9.

The horizontal shaft 12 is journaled through the sides of the elevator and uprights 9. The sprocket-wheels 13 and 14 are fixed to the said shaft.

The sprocket-chain 15 passes around the sprocket-wheels 5 and 14.

The elevator is provided with the sides 16. The shaft 18 is journaled in the sides 16 of the elevator, near the upper ends thereof. The sprocket-wheel 19 is fixed to the said shaft 18.

The sprocket-chain 20 passes around the sprocket-wheels 13 and 19.

The spring-actuated chain-tightener 21 bears against the chain 20 and is adapted to keep the same taut.

The spring-actuated chain-tightener 22 is attached to the sides 16 of the elevator and bears against the sprocket-chain 15 and is adapted to retain the same in taut condition.

The sprocket-wheels 23 are mounted upon the shaft 18, and the sprocket-chains 24 24 pass around the said sprocket-wheels 23.

The screw-actuated blocks 25 are adapted to move the shaft 18 laterally and take up any slack that occurs in the chains.

The shaft 26 is horizontally journaled at the lower end of the elevator and is provided with wheels 27, around which the sprocket-chains 24 also pass.

The pans 28 are carried by the sprocket-chains 24. These pans will be more fully described hereinafter.

The shovel 29 is attached to the bottom of the elevator. A frame 30 is attached to the shaft 26 and is provided with the metallic bars 31, which are inclined downwardly and forwardly at their lower ends and which are spaced apart, forming a screen or riddle. The lower ends of the said bars rest upon the forward portion of the shovel 29, as shown in Fig. 1.

The roller 32 travels in front of the shovel 29 and is supported by the braces 33 and 34.

Said roller 32 travels upon the surface of the ground. The braces 33 are slotted at their upper ends and may be adjustably attached to the sides 16 of the said elevator, while the rear ends of the braces 34 are adjustably fastened to the sides 16 of the elevator. By this arrangement it is obvious that the said roller 32 may be elevated or lowered with relation to the plow 29, and consequently the depth at which the same will cut below the surface upon which the roller travels may be regulated.

The hopper 35 is attached to the upper end of the elevator and is intended to receive substance dumped from the elevator-pans. The said hopper is provided with a ring or band 36, fitting around the lower circular part thereof and which is provided with the hangers 37. The said hangers 37 are pivotally fastened to the rings 36 and carry the upper end of the chute 38. The cable 39 is attached to the said chute 38 and passes over the pulley of block 43, attached to the swiveled upright 42, and winds about the drum 44, which in turn is mounted for rotation from the top of the elevator. The inner walls of the chute 38 are provided with the horizontally-extending ribs 40, upon which may rest the edges of sand-screens.

The extension-chute 41 is attached to the end of the main chute 38 and is in the same plane substantially as the screens that rest upon the flanges 40.

The strips 45 are pivotally fastened to the sides of the elevator and extend below the elevator-pans 28, and the rope or cable 46 is secured to the lower ends of the said strips 45.

The drum 47 is mounted for rotation upon the trapezoid frame 6, and by winding the said rope 46 about the said drum the rear end of the elevator may be raised, during which operation the shaft 12 serves as a pivot. The said drum 47 is rotated by means of the worm-gear 48, which in turn is operated by the hand-wheel and shaft 49.

The caster 50 is pivotally attached to the forward end of the trapezoid frame 6.

The lower side of the clevis 51 is fastened to the vertical part of the caster 50 below the edge of the front piece 7 of the frame. The said clevis 51 is long enough to swing around the corner of the truck-frame to permit of short turning of the implement.

The ordinary truck-pole 52 is suitably connected with the axle 4, and to the said pole the draft-animals (not shown) are hitched.

The braces 53 are fastened at their lower ends to the sides of the shovel 29 and at their ends are adjustably attached to the sides 16 of the elevator and may be manipulated so as to adjust the angle of inclination of the shove 29.

The spring clutch machinery 54 is mounted upon the axle 3 and clutches sprocket-wheel 5 and is adapted to be used to throw the mechanism in or out of gear.

The plow shovel or cutter is provided with the point or cutting edge 55, which is slightly curved down.

The upwardly-curved bars 56 are located at the back of the shovel and are spaced apart and are adapted to retain the gravel of a desired size, while the smaller gravel will pass through.

In some instances the pans 28 are provided with the parallel teeth 57, which coöperate with the bars 56 in separating out the larger gravel and in separating potatoes from soil. When it is intended to elevate all substances cut by the plow 29, the pans 28, with solid walls, are used.

The chute used for separating potatoes from soil is provided with the pad 58, upon which the potatoes may be deposited without bruising.

The rods 59 are spaced just far enough apart to allow the small potatoes to pass through, while the rods 60 are spaced apart to permit the larger grade of potatoes to pass through, while the largest potatoes pass over the ends of the said rods 60.

The chutes 61 61 are located directly under the rod-sections 59 and 60, and suitable sacks for holding the potatoes may be hooked to the said chutes 61.

The lips 62 are attached to the edges of the pan 28, while the lips 63 are attached to the links of the chains 24. The said lips 62 and 63 are pivotally connected together by means of cross-pins.

The lips 62 at either front or back edge of the pan 28 are mounted for sliding movement in the elongated slot 64 and are adapted to move in the said slots when the pans 28 go around the wheels 23 and 27.

The edges of the pans 28 are curved, as at 65, in order to permit the said pans to move smoothly around the said wheels.

The teeth 57 in the modified form of pan 28 are long enough to rake through the rods 56 of the shovel 29 and prevents the said shovel from becoming clogged with material.

From the foregoing description the operation of the implement in digging, elevating, and delivering material is obvious.

Having described my invention, what I claim as new, and desire to secure by Letters Patent, is—

1. An implement of the character described consisting of a wheel-mounted elevator, a shovel located at the lower end thereof and having a cutting edge and bars spaced apart and inclined upwardly and rearwardly from said cutting edge, the lower end of the elevator entering the shovel in the rear of said bars.

2. An implement of the character as described consisting of a wheel-mounted elevator, a shovel attached to the lower end thereof, a roller traveling in front of said shovel, bars pivoted at their rear ends to the elevator and being attached at their forward ends to said roller, and slotted uprights adjustably secured at their upper ends to said elevator and being attached at their lower ends to said roller.

In testimony that I claim the foregoing as my own I have hereto affixed my signature in the presence of two witnesses.

GEORGE T. SEBRELL.

Witnesses:
E. E. WILSON,
ZACK L. TAYLOR.